United States Patent
Hsiao et al.

(10) Patent No.: US 9,548,692 B2
(45) Date of Patent: Jan. 17, 2017

(54) POWER CONTROL SYSTEM AND METHOD OF CONTROLLING THE SAME

(71) Applicant: DELTA ELECTRONICS, INC., Taoyuan County (TW)

(72) Inventors: Chih-Hung Hsiao, Taoyuan County (TW); Jo-Fang Wei, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 347 days.

(21) Appl. No.: 14/231,361

(22) Filed: Mar. 31, 2014

(65) Prior Publication Data

US 2015/0194917 A1 Jul. 9, 2015

(30) Foreign Application Priority Data

Jan. 6, 2014 (CN) .......................... 2014 1 0005863

(51) Int. Cl.
*H02P 11/00* (2006.01)
*H02P 9/10* (2006.01)

(52) U.S. Cl.
CPC .................................... *H02P 9/102* (2013.01)

(58) Field of Classification Search
CPC ....................................................... H02P 9/102
USPC ....................................... 290/44, 55; 322/21
See application file for complete search history.

(56) References Cited

U.S. PATENT DOCUMENTS

| 4,748,337 A * | 5/1988 | Raad | F02N 11/04 290/31 |
|---|---|---|---|
| 5,625,276 A * | 4/1997 | Scott | B23K 9/1062 310/114 |
| 6,737,836 B2 * | 5/2004 | Namai | H02P 9/08 322/24 |
| 8,076,789 B2 | 12/2011 | Miller | |
| 2004/0021323 A1 * | 2/2004 | Lee | B60K 6/46 290/40 C |
| 2009/0085354 A1 * | 4/2009 | Tan | H02P 9/42 290/44 |
| 2011/0134574 A1 * | 6/2011 | Ritter | H02P 9/007 361/21 |
| 2011/0142634 A1 * | 6/2011 | Menke | F03D 7/0224 416/46 |
| 2012/0062143 A1 * | 3/2012 | Sugawara | H05B 33/0818 315/291 |
| 2012/0175876 A1 * | 7/2012 | Pendray | F02D 19/02 290/41 |
| 2013/0214536 A1 * | 8/2013 | Wakasa | H02J 3/386 290/44 |

* cited by examiner

*Primary Examiner* — Tulsidas C Patel
*Assistant Examiner* — Thomas Quigley
(74) *Attorney, Agent, or Firm* — Hauptman Ham, LLP

(57) ABSTRACT

A power control system for a generator includes a control unit, an input sensing unit, an output sensing unit, and a power conversion unit. The input sensing unit senses a voltage and a current, generated from the generator. The output sensing unit senses a load voltage and a load current, received by the load. The power conversion unit receives the voltage and the current, and converts the voltage and the current into the load voltage and the load current. The control unit judges and predicts the mechanical behavior of the generator to control the generator according to the received voltage, the current, the load voltage, and the load current.

17 Claims, 9 Drawing Sheets

POWER CONTROL SYSTEM AND METHOD OF CONTROLLING THE SAME

BACKGROUND

1. Technical Field

The present invention generally relates to a power control system and a method of controlling the same, and more particularly to a power control system and a method of controlling the same applied to a generator.

2. Description of Related Art

U.S. Pat. No. 8,076,789 disclosed a system and a method for controlling a wind turbine power output. The method includes determining a predicted wind speed for the wind turbine, determining a current wind turbine power output, and determining a predicted wind turbine power output utilizing the predicted wind speed. The method also includes comparing the current wind turbine power output to the predicted wind turbine power output and adjusting the wind turbine power output based on the comparison of the current wind turbine power output and the predicted wind turbine power output. In the current wind turbine control system, the anemometer is commonly used to measure wind speed. However, the cost of installing the anemometer is relatively high for the wind turbine control system, and more particularly for a small-scale wind turbine control system. In other words, it is unfavorable that the anemometer is used for wind speed measurement in the small-scale wind turbine control system because of the limited power density and cost recovery.

SUMMARY

An object of the present invention is to provide a power control system for controlling a generator connected to an input bus and providing the output power generated from the generator to a load connected to an output bus. The power control system includes a control unit, an input sensing unit, an output sensing unit, a load-dumping unit, a normally-closed switch unit, and a power conversion unit. The input sensing unit is connected to the input bus for sensing a voltage and a current, generated from the generator, and transmitting the voltage and the current to the control unit. The output sensing unit is connected to the output bus for sensing a load voltage and a load current, received by the load, and transmitting the load voltage and the load current to the control unit. The load-dumping unit is connected between the input bus and the control unit to provide a load-dumping operation for the output power of the generator. The normally-closed switch unit is connected between the input sensing unit and the control unit. The power conversion unit is connected between the input bus, the output bus, and the control unit to receive the voltage and the current and convert the voltage and the current into the load voltage and the load current, respectively. The control unit judges and predicts the mechanical behavior of the generator to control the generator according to the voltage, the current, the load voltage, and the load current.

Another object of the present invention is to provide a power control system for controlling the output power generated from a generator to a load. The power control system includes a control unit, an input sensing unit, an output sensing unit, and a normally-closed switch unit. The input sensing unit senses a voltage and a current, generated from the generator, and transmits the voltage and the current to the control unit. The output sensing unit senses a load voltage and a load current, received by the load, and transmits the load voltage and the load current to the control unit. The normally-closed switch unit is connected between the input sensing unit and the control unit. A no-energy stage is executed when the generator does not output the power or the generator does not output the power for a waiting time; at the no-energy stage, the normally-closed switch unit is in a short-circuit condition so that an external power is supplied to only the control unit, the input sensing unit, and the output sensing unit.

Further another object of the present invention is to provide a method of controlling a power control system to control a generator connected to an input bus and provide the output power generated from the generator to a load connected to an output bus, the method includes the following steps. First, a control unit, an input sensing unit, and an output sensing unit are provided. The input sensing unit is connected to the input bus for sensing a voltage and a current, generated from the generator, and transmitting the voltage and the current to the control unit. The output sensing unit is connected to the output bus for sensing a load voltage and a load current, received by the load, and transmitting the load voltage and the load current to the control unit. Afterward, a load-dumping unit is provided. The load-dumping unit is connected between the input bus and the control unit for providing a load-dumping operation for the output power of the generator, and then a normally-closed switch unit is provided. The normally-closed switch unit is connected between the input sensing unit and the control unit. Afterward, a power conversion unit is provided. The power conversion unit is connected between the input bus, the output bus, and the control unit for receiving the voltage and the current and converting the voltage and the current into the load voltage and the load current, respectively. Finally, the control unit judges and predicts the mechanical behavior of the generator to control the generator according to the voltage, the current, the load voltage, and the load current.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

DETAILED DESCRIPTION

Figure 1:
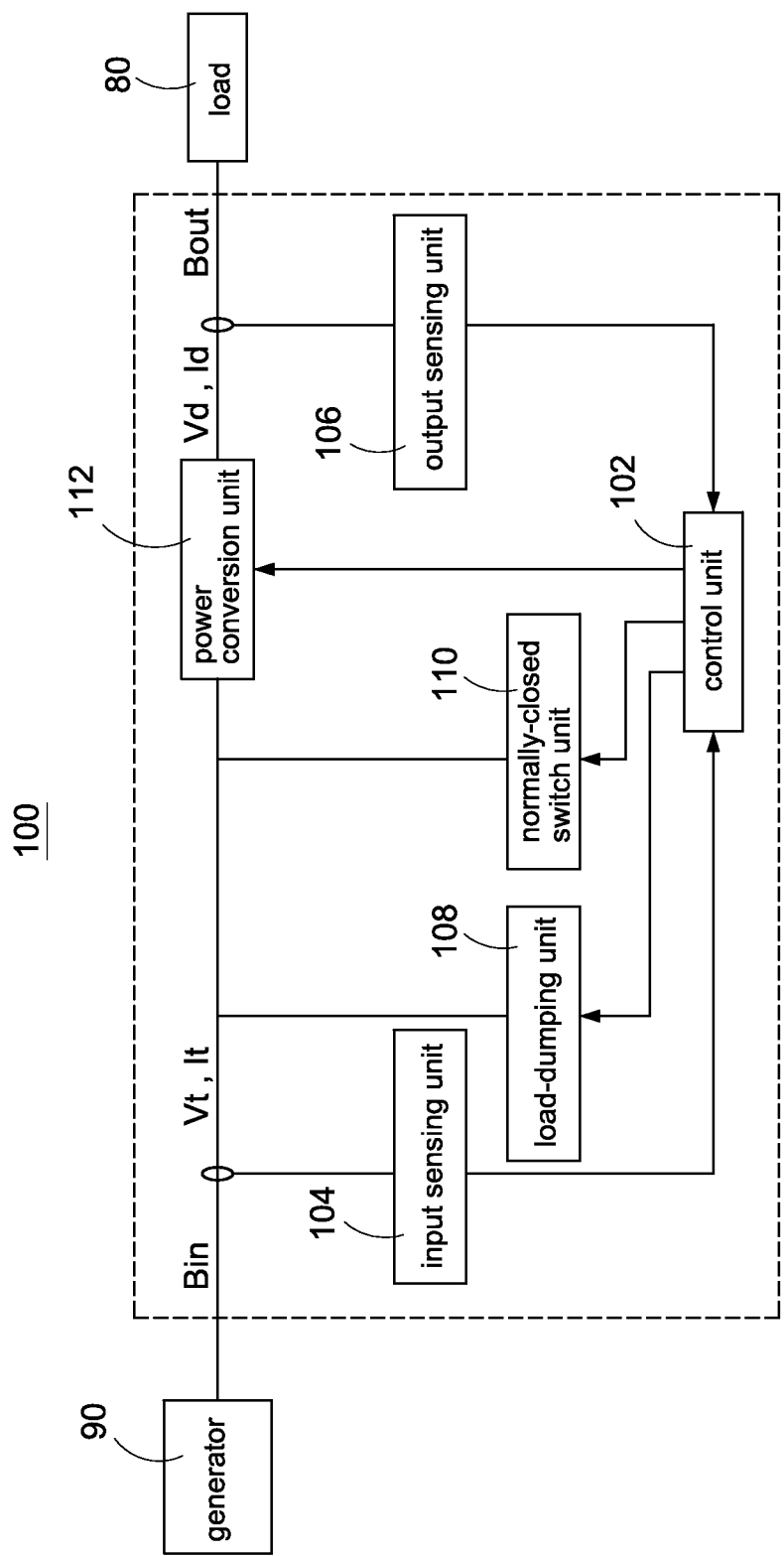
FIG. 1 is a circuit block diagram of a power control system according to a first embodiment of the present invention.

Reference will now be made to the drawing figures to describe the present invention in detail.

FIG. 1 is a circuit block diagram of a power control system according to a first embodiment of the present invention. The generator disclosed in this present invention can be a permanent magnet generator (PMG), a wind turbine, or a water turbine. The power control system 100 is provided to control a generator 90 connected to an input bus Bin, and provides output power generated from the generator 90 to a load 80, which can be a rechargeable battery or a utility grid, connected to an output bus Bout. The power control system 100 for the generator 90 includes a control unit 102, an input sensing unit 104, an output sensing unit 106, a load-dumping unit 108, a normally-closed switch unit 110, and a power conversion unit 112. The input sensing unit 104 is connected to the input bus Bin to sense a voltage Vt and a current It, generated from the generator 90, and transmit the sensed voltage Vt and the sensed current It to the control unit 102. The output sensing unit 106 is connected to the output bus Bout to sense a load voltage Vd and a load current Id, received by the load 80, and transmit the load voltage Vd and the load current Id to the control unit 102. The load-dumping unit 108 is connected between the input bus Bin and the control unit 102, and provides a load-dumping operation for the output power of the generator 90. The normally-closed switch unit 110 is connected between the input sensing unit 104 and the control unit 102. The power conversion unit 112 is connected between the input bus Bin, the output bus Bout, and the control unit 102, receives the voltage Vt and the current It, and converts the voltage Vt and the current It into the load voltage Vd and the load current Id. The control unit 102 judges and predicts the mechanical behavior of the generator 90 to control the generator 90 according to the received voltage Vt, the current It, the load voltage Vd, and the load current Id. More specifically, the generator is driven by external force, such as wind power, hydraulic force, vapor force, or even human power. However, the embodiments are only exemplified but are not intended to limit the scope of the disclosure. The load-dumping unit 108 can be a load-dumping element, which is controlled by the pulse-width modulation. The power conversion unit 112 can be an AC-to-DC power conversion circuit, which is controlled by the pulse-width modulation.

Figure 2:
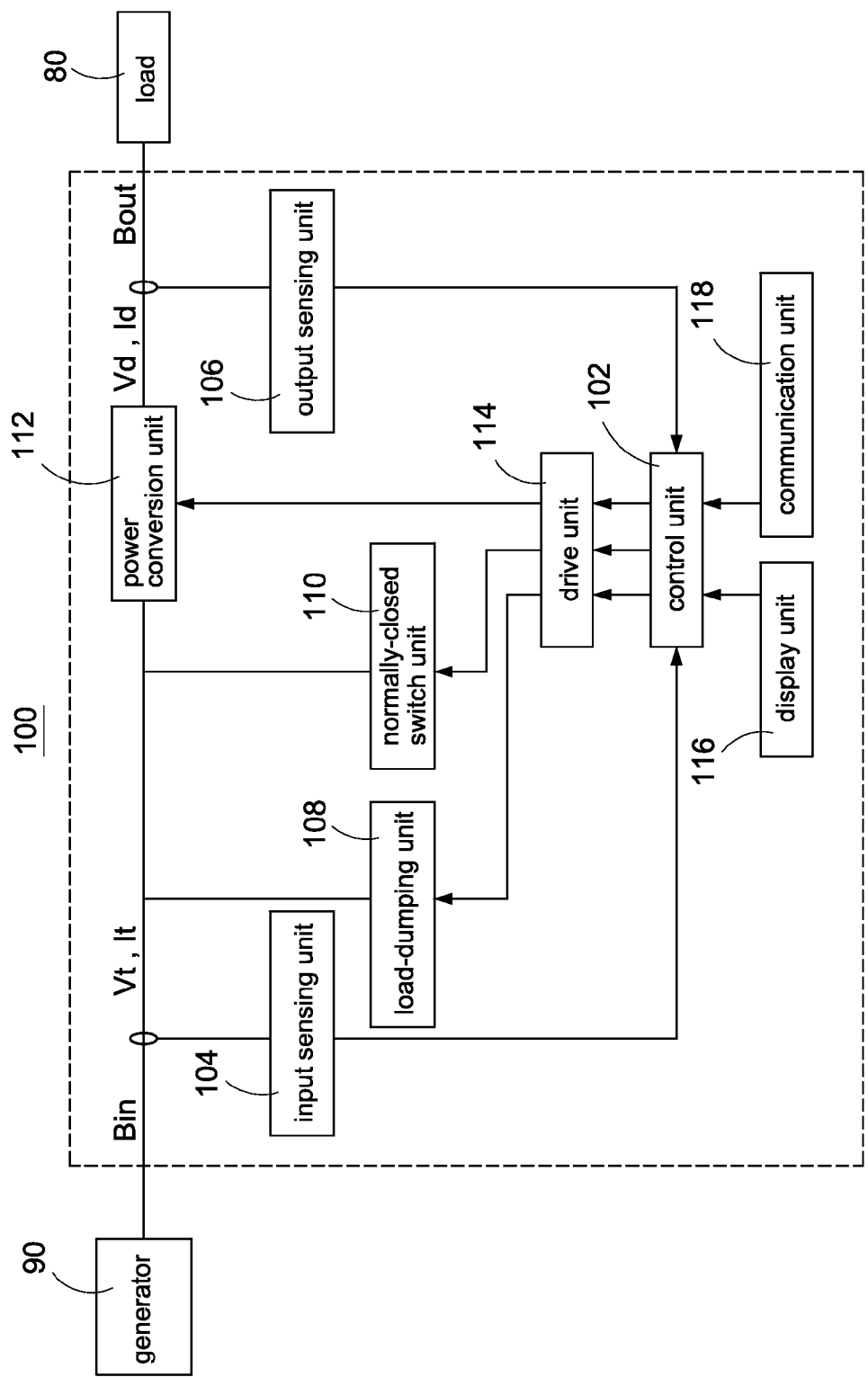
FIG. 2 is a circuit block diagram of the power control system according to a second embodiment of the present invention.

FIG. 2 is a circuit block diagram of the power control system according to a second embodiment of the present invention. The major difference between the first embodiment and the second embodiment is that the power control system of the second embodiment further includes a drive unit 114, a display unit 116, and a communication unit 118.

The drive unit 114 is PWM drive unit. The drive unit 114 is connected to the load-dumping unit 108, the normally-closed switch unit 110, the power conversion unit 112, and the control unit 102. The drive unit 114 receives a plurality of control signals generated from the control unit 102 to control the load-dumping unit 108, the normally-closed switch unit 110, and the power conversion unit 102, respectively. The display unit 116 is connected to the control unit 102 to display operation stages of the power control system. The communication unit 118 is connected to the control unit 102 to provide communication operations of the power control system. The detailed operation of the power control system will be described hereinafter as follows.

Figure 3A:
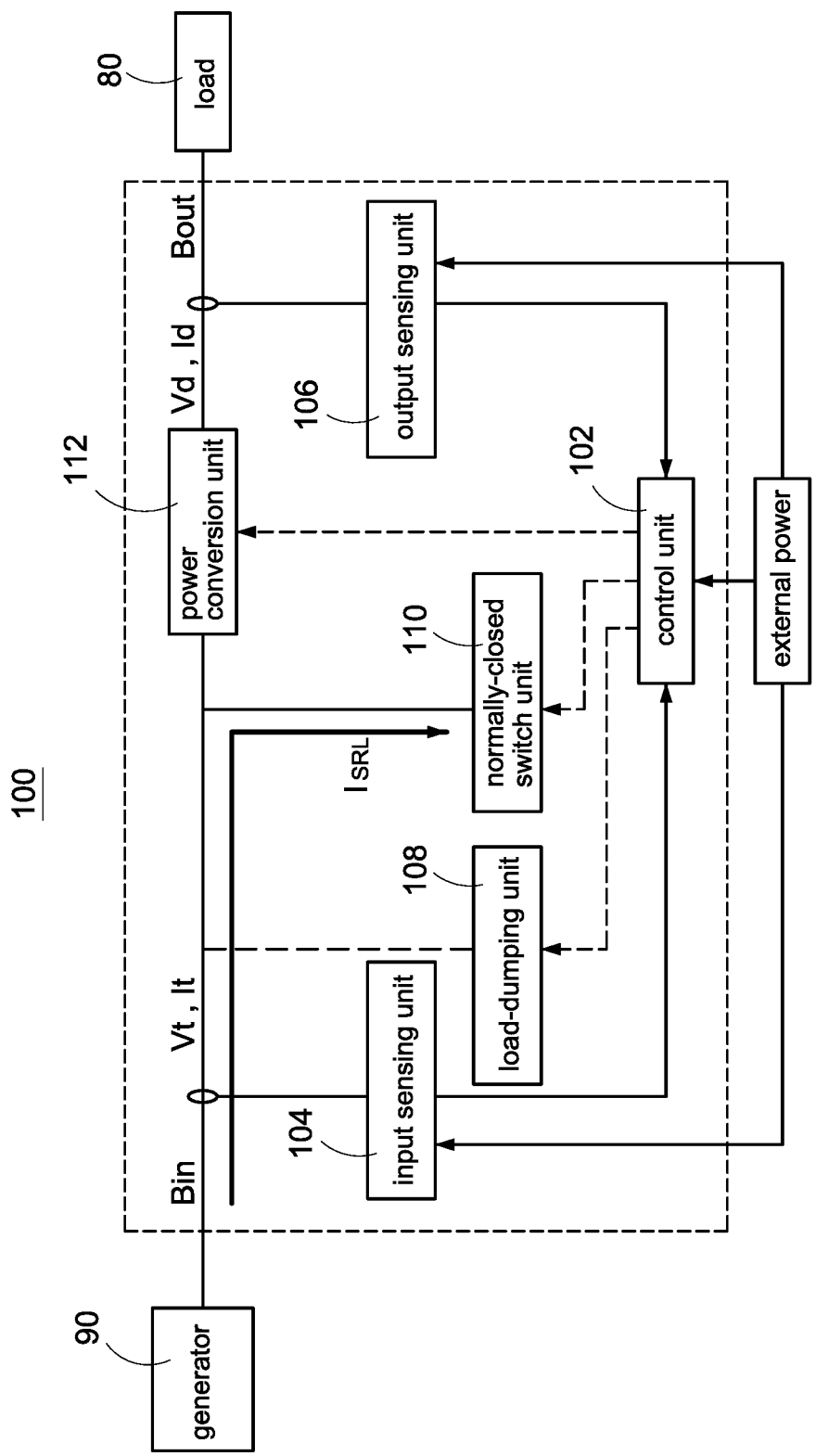
FIG. 3A is a circuit block diagram of the power control system operating at a no-energy stage according to the present invention.

FIG. 3A is a circuit block diagram of the power control system operating at a no-energy stage according to the present invention. As mentioned above, the no-energy stage is executed when the generator 90 does not output power or the generator 90 does not output power after the waiting time. At the no-energy stage, the normally-closed switch unit 110 is used to short the input bus in a three-phase short-circuit manner so that the external power is supplied to only the control unit 102, the input sensing unit 104, and the output sensing unit 106. At this stage, a current detected by the input sensing unit 10 is a short-circuit current ISRL which flows through the normally-closed switch unit 110. Accordingly, it is to significantly reduce the dependence of the power control system on the external power when the power control system is operated at the no-energy stage. In particular, the unavailable paths and circuit units at this stage are illustrated in dashed lines. Further, when the short-circuit current is detected or the display unit or the communication unit is triggered, all circuit units are available at the normal operation of the external power. Accordingly, the normally-closed switch unit is closed when the generator does not output power, and the normally-closed unit is opened when the generator outputs power.

Figure 3B:
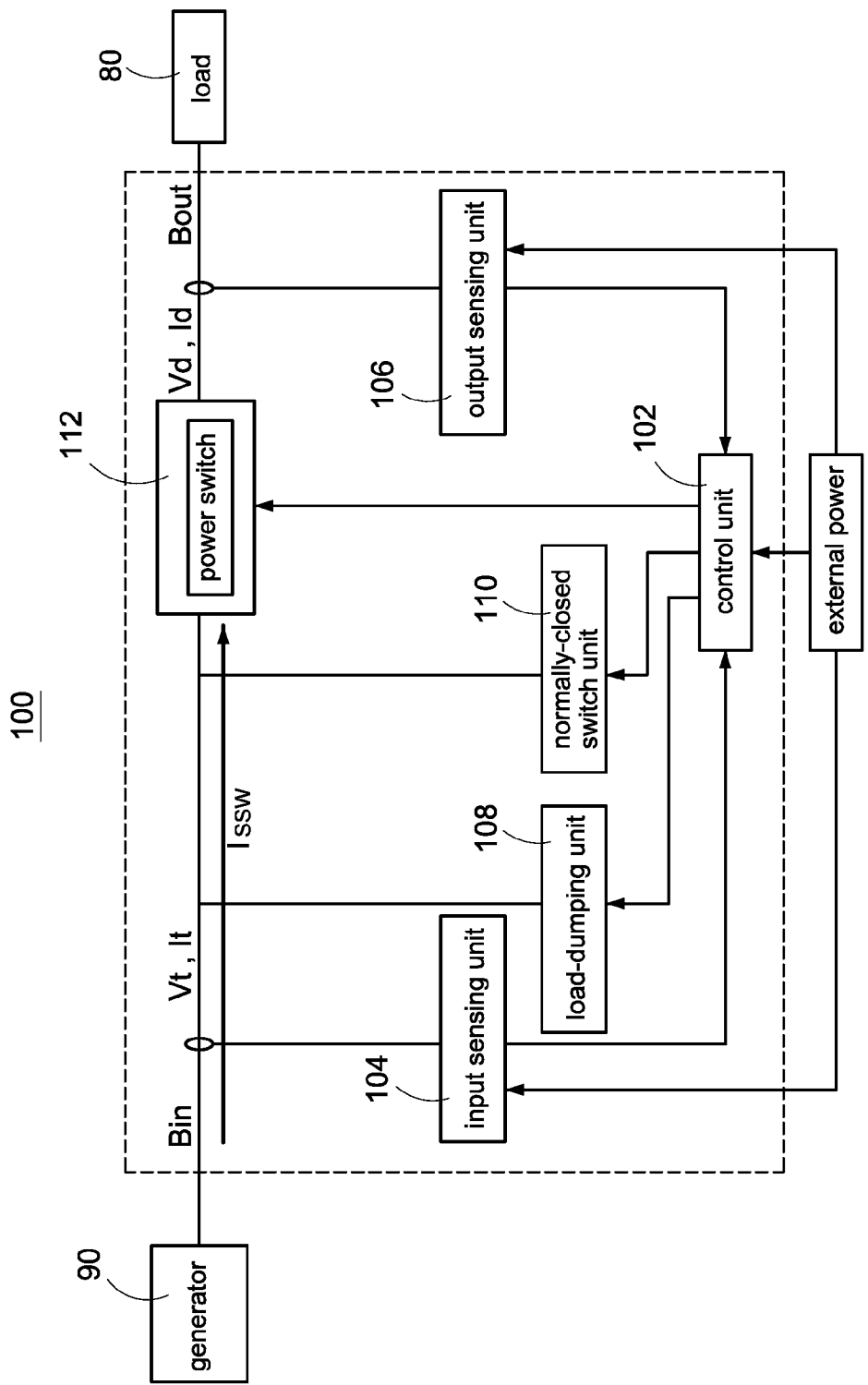
FIG. 3B is a circuit block diagram of the power control system while turning on a power switch according to the present invention.

FIG. 3B is a circuit block diagram of the power control system while turning on a power switch according to the present invention. As mentioned above, the power switch is turned on to brake the generator 90 in a short-circuit manner. In this condition, a current detected by the input sensing unit 104 is a short-circuit current $I_{SSW}$ which flows through the power switch of the power conversion unit 112.

Figure 3C:
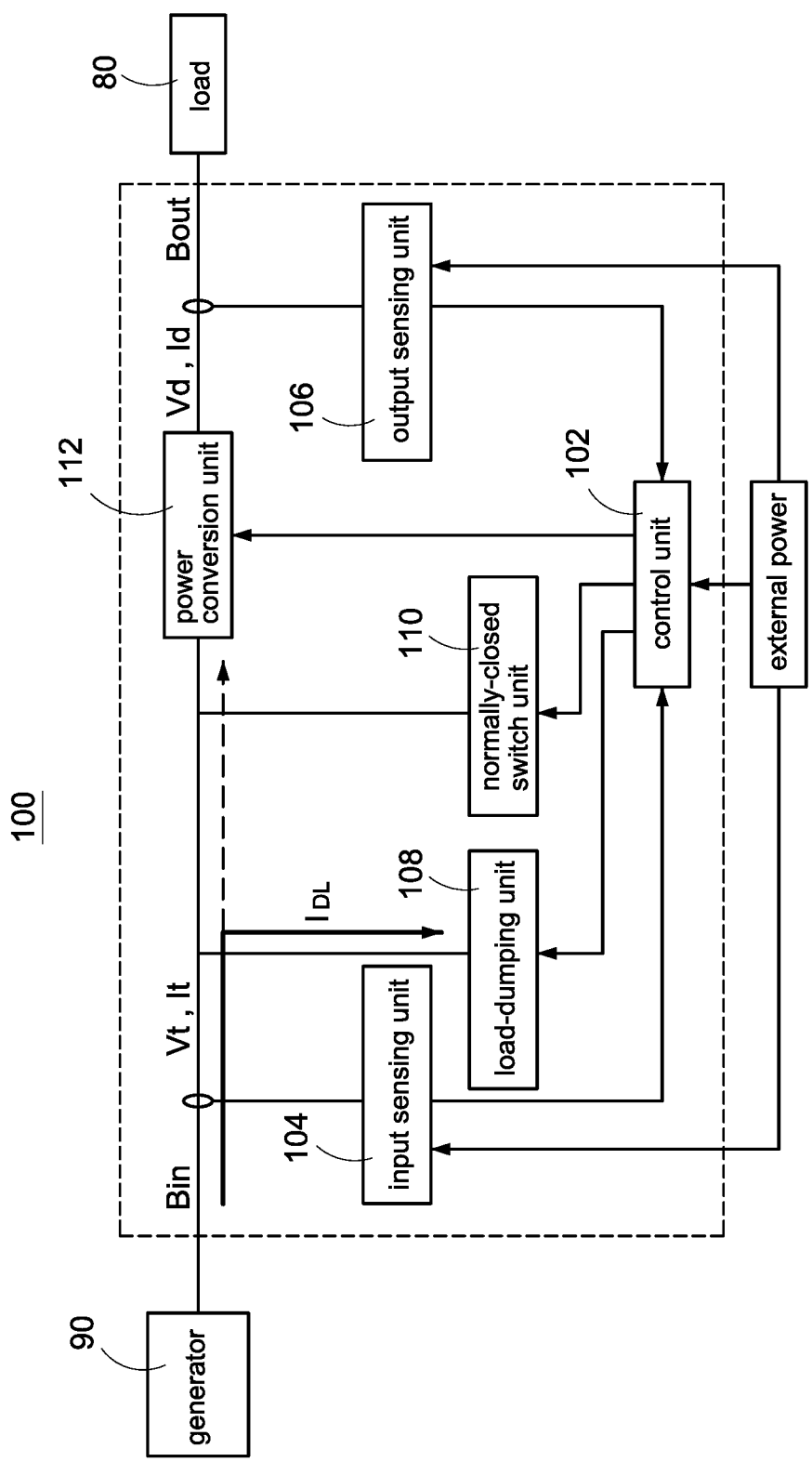
FIG. 3C is a circuit block diagram of the power control system operating at a no-load stage according to the present invention.

FIG. 3C is a circuit block diagram of the power control system operating at a no-load stage according to the present invention. As mentioned above, the no-load stage is executed when no loading occurs. At this stage, the load-dumping unit 108 provides the load-dumping operation for the output power of the generator 90 so that the voltage generated from the generator 90 is reduced and the output power of the generator 90 is reduced. Accordingly, a current detected by the input sensing unit 104 is equal to the sum of a load-dumping current $I_{DL}$ (the greater part) which flows through the load-dumping unit 108 and a loading current (the smaller part) which flows to the load 80 for providing an acceptable voltage to the load 80.

Figure 3D:
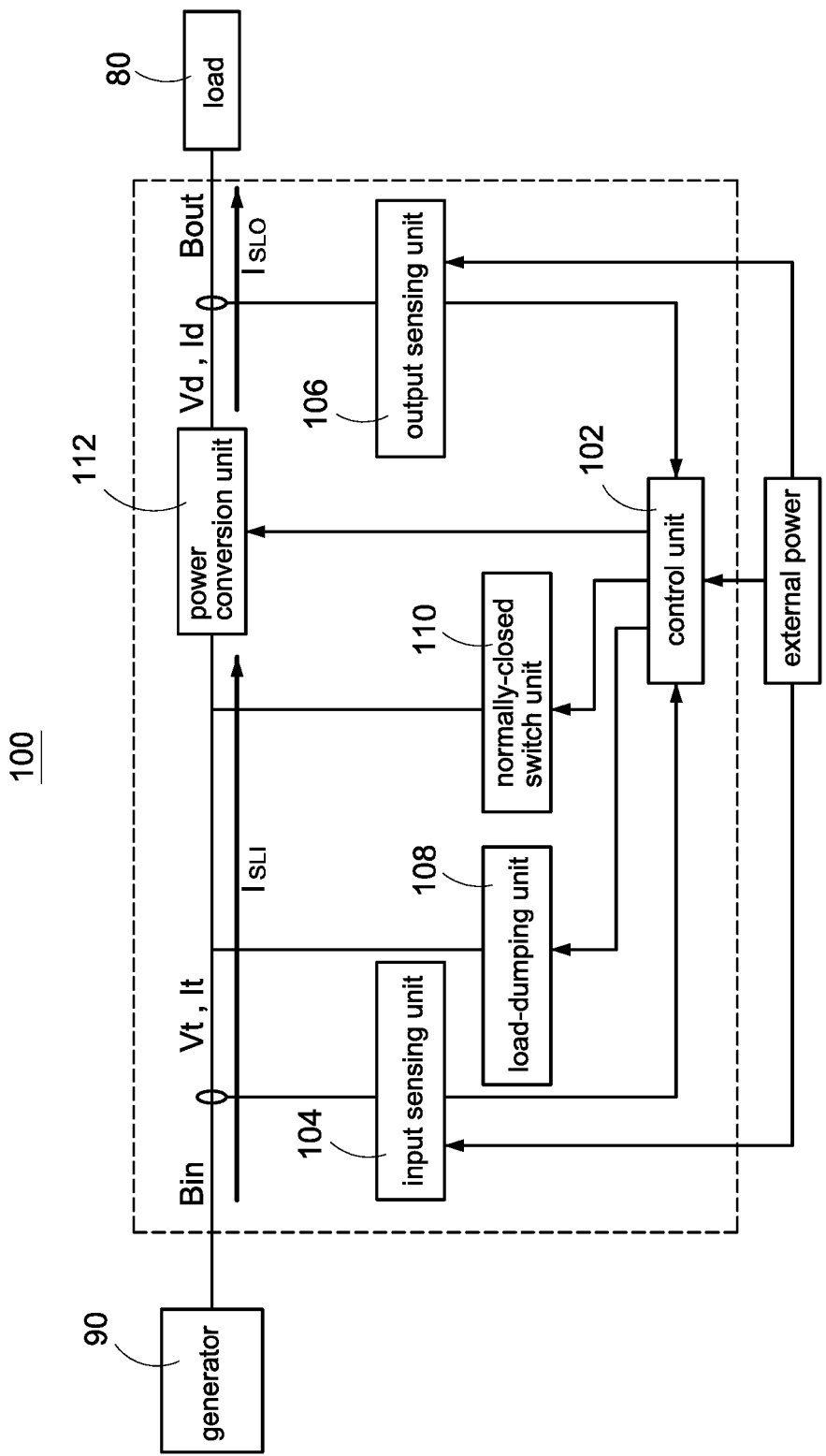
FIG. 3D is a circuit block diagram of the power control system operating at a normal loading stage according to the present invention.

FIG. 3D is a circuit block diagram of the power control system operating at a normal loading stage according to the present invention. At this stage, the output power of the generator 90 is coordinated with the loading of the load 80, and a current detected by the input sensing unit 104 is a normal loading input current $I_{SLI}$ which flows through the input bus Bin and a current detected by the output sensing unit 106 is a normal loading output current $I_{SLO}$ which flows through the output bus Bout.

Figure 3E:
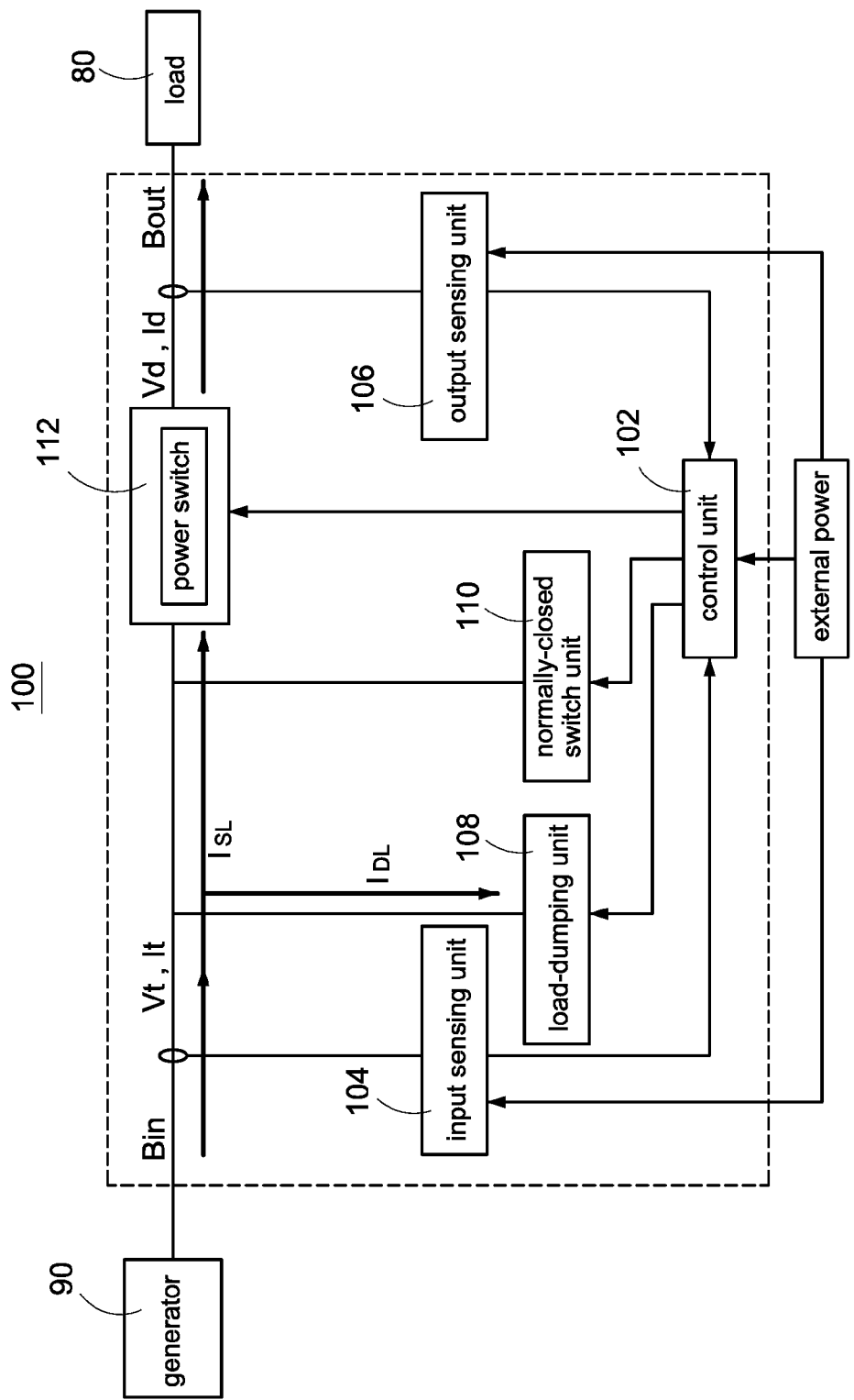
FIG. 3E is a circuit block diagram of the power control system operating at a brake stage according to the present invention.

FIG. 3E is a circuit block diagram of the power control system operating at a brake stage according to the present invention. At this stage, the voltage generated from the generator 90 is gradually reduced, and the control unit 102 directly turns on the power switch to brake the generator 90 in the short-circuit manner when the voltage is less than a threshold voltage value. Also, a current detected by the input sensing unit 104 is equal to the sum of a load-dumping current $I_{DL}$ which flows through the load-dumping unit 108 and a supplying current $I_{SL}$ which flows through the power conversion unit 112.

Figure 4:
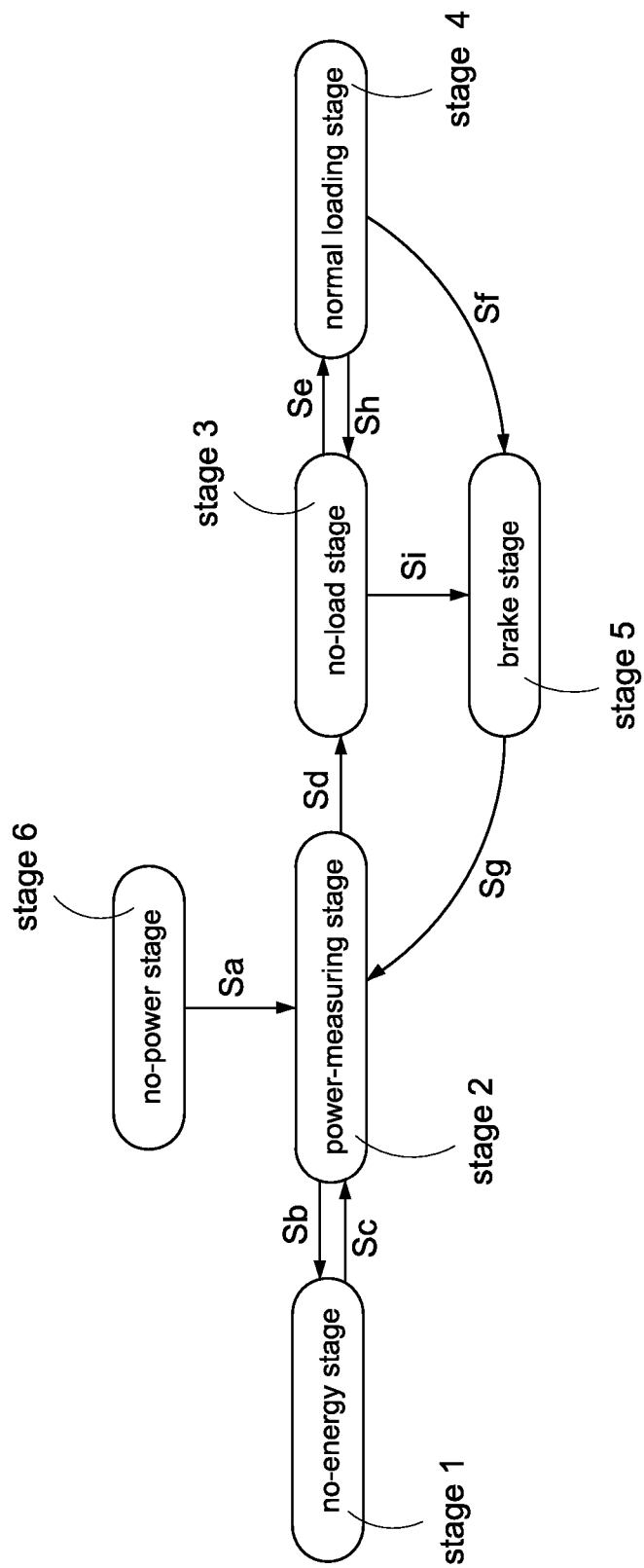
FIG. 4 is a block diagram of a relationship between different operation stages of the power control system according to the present invention.

FIG. 4 is a block diagram of a relationship between different operation stages of the power control system according to the present invention. FIG. 4 illustrates the relationship between different stages in detail, such as the no-energy stage (stage 1), the power-measuring stage (stage 2), the no-load stage (stage 3), the normal loading stage (stage 4), the brake stage (stage 5), and the no-power stage (stage 6). Further, the control unit 102 judges and predicts the mechanical behavior of the generator 90 to control the generator 90 to be operated at the above-mentioned stages according to the voltage, the current, the load voltage, and the load current.

Figure 5:
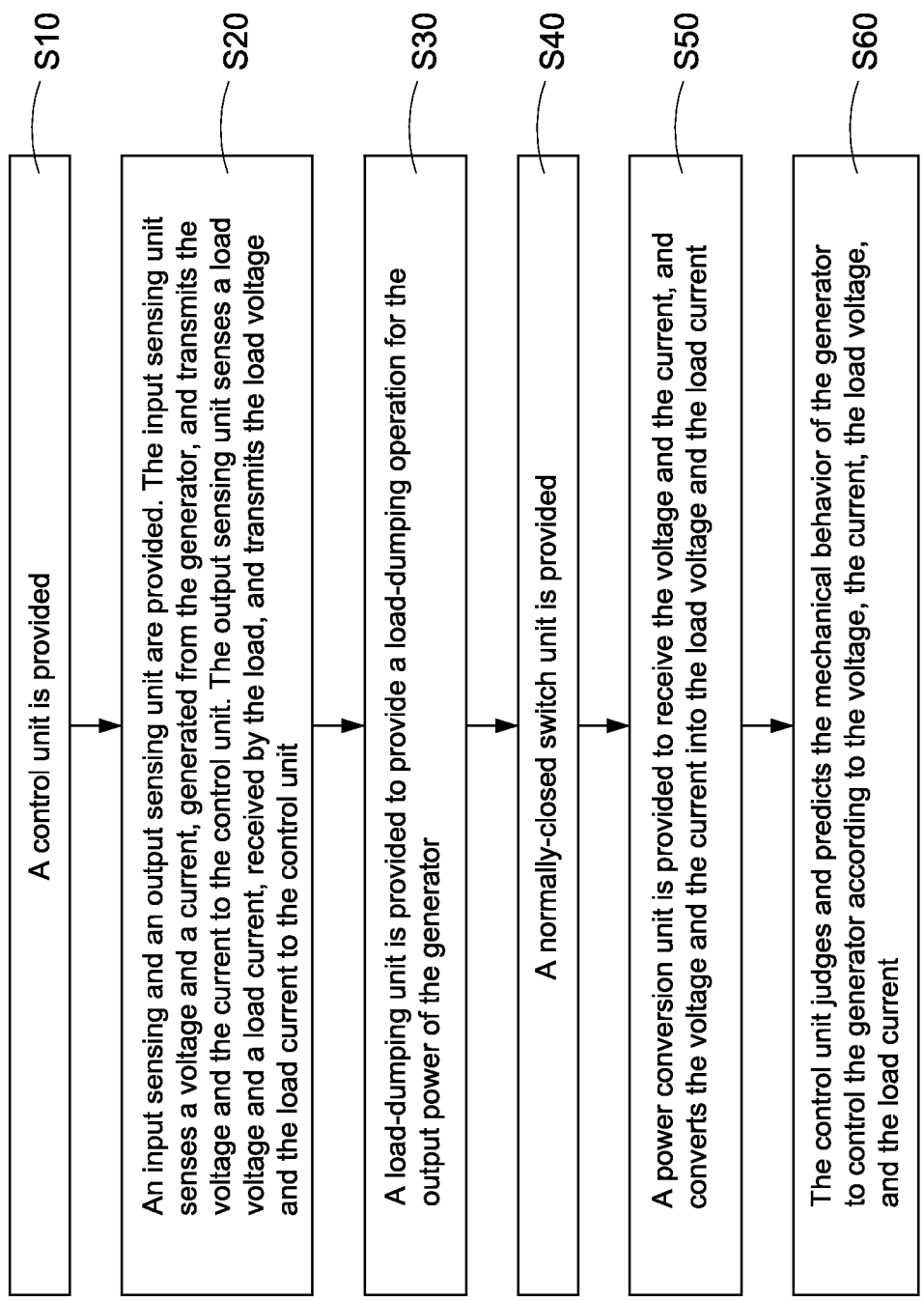
FIG. 5 is a flowchart of a method of controlling a power control system according to the present invention.

Please also refer to FIG. 5 which is a flowchart of a method of controlling a power control system according to the present invention. The method controls a generator connected to an input bus and provides the output power generated from the generator to a load connected to an output bus. The method includes following steps. First, a control unit is provided (S10). Afterward, an input sensing and an output sensing unit are provided (S20). The input sensing unit is connected to the input bus to sense a voltage and a current, generated from the generator, and transmit the voltage and the current to the control unit. The output sensing unit is connected to the output bus to sense a load voltage and a load current, received by the load, and transmit the load voltage and the load current to the control unit.

Afterward, a load-dumping unit is provided (S30). The load-dumping unit is connected between the input bus and the control unit, and provides a load-dumping operation for the output power of the generator, and then a normally-closed switch unit is provided (S40). The normally-closed switch unit is connected between the input sensing unit and the control unit. In particular, the normally-closed switch is a normally-closed relay. Next, a power conversion unit is provided (S50). The power conversion unit is connected between the input bus, the output bus, and the control unit, receives the voltage and the current, and converts the voltage and the current into the load voltage and the load current. Finally, the control unit judges and predicts the mechanical behavior of the generator to control the generator according to the voltage, the current, the load voltage, and the load current (S60).

Especially, the power control system is further operated at an abnormal interruption stage and a manual shutdown stage. The abnormal interruption stage is usually executed when abnormal conditions occur in the system, such as the load-dumping is abnormal, the unbalanced voltage, the phase-failure voltage or the over voltage of the generator, leakage of the control unit, and so on. The manual shutdown stage is usually executed to provide an emergent protection by the operator to manually operate buttons of the display unit or interfaces of the communication unit. The detailed operations and sequences between the different stages will be described hereinafter as follows.

For convenience, the stages as shown in FIG. 4 are listed below: (1) no-energy stage (stage1), (2) power-measuring stage (stage 2), (3) no-load stage (stage 3), (4) normal loading stage (stage 4), (5) brake stage (stage 5), and (6) no-power stage (stage 6). In addition, conversion steps between the stages are described as follows:

(a) Step a (Sa): the no-power stage (stage 6) is transferred to the power-measuring stage (stage 2) when the external power is normal;

(b) Step b (Sb): the power-measuring stage (stage 2) is transferred to the no-energy stage (stage1) when the generator does not output the short-circuit current for a period of time;

(c) Step c (Sc): the no-energy stage (stage1) is transferred to the power-measuring stage (stage 2) when the short-circuit current is detected or buttons of the display unit or interfaces of the communication unit are triggered;

(d) Step d (Sd): the power-measuring stage (stage 2) is transferred to the no-load stage (stage 3) when the current is within a security range;

(e) Step e (Se): the no-load stage (stage 3) is transferred to the normal loading stage (stage 4) when the output current is detected;

(f) Step f (Sf): the normal loading stage (stage 4) is transferred to the brake stage (stage 5) when the output power of generator is excessive or buttons of the display unit or interfaces of the communication unit are triggered;

(g) Step g (Sg): the brake stage (stage 5) is transferred to the power-measuring stage (stage 2) when the voltage is extremely low;

(h) Step h (Sh): the normal loading stage (stage 4) is transferred to the no-load stage (stage 3) when no output current is detected; and (i) Step I (Si): the no-load stage (stage 3) is transferred to the brake stage (stage 5) when no loading is detected for a period of time or buttons of the display unit or interfaces of the communication unit are triggered.

The common transferences between the different operation stages of the power control system are listed as follows.

A. The final stage is the normal loading stage (stage 4):

1. If the initial stage is the no-load stage (stage 3), the operation is from the no-load stage (stage 3) to the normal loading stage (stage 4) via the step e (Se).

2. If the initial stage is the power-measuring stage (stage 2), the operation is from the power-measuring stage (stage 2) to the normal loading stage (stage 4) via the step d (Sd) and the step e (Se).

3. If the initial stage is the no-power stage (stage 6), the operation is from the no-power stage (stage 6) to the normal loading stage (stage 4) via the step a (Sa), the step d (Sd), and the step e (Se).

B. The final stage is the no-energy stage (stage1):

1. If the initial stage is the power-measuring stage (stage 2), the operation is from the power-measuring stage (stage 2) to the no-energy stage (stage1) via the step b (Sb).

2. If the initial stage is the no-load stage (stage 3), the operation is from the no-load stage (stage 3) to the no-energy stage (stage1) via the step i (Si), the step g (Sg), and the step (Sb).

3. If the initial stage is the normal loading stage (stage 4), the operation is from the normal loading stage (stage 4) to the no-energy stage (stage1) via the step h (Sh), the step i (Si), the step g (Sg), and the step b (Sb).

C. The final stage is the power-measuring stage (stage 2):

1. If the initial stage is the no-energy stage (stage1), the operation is from the no-energy stage (stage1) to the power-measuring stage (stage 2) via the step c (Sc).

2. If the initial stage is the no-power stage (stage 6), the operation is from the no-power stage (stage 6) to the power-measuring stage (stage 2) via the step a (Sa).

3. If the initial stage is the no-load stage (stage 3), the operation is from the no-load stage (stage 3) to the power-measuring stage (stage 2) via the step i (Si) and the step g (Sg).

D. The final stage is the no-load stage (stage 3):

1. If the initial stage is the power-measuring stage (stage 2), the operation is from the power-measuring stage (stage 2) to the no-load stage (stage 3) via the step d (Sd).

2. If the initial stage is the normal loading stage (stage 4), the operation is from the normal loading stage (stage 4) to the no-load stage (stage 3) via the step h (Sh).

E. The final stage is the no-power stage (stage 6):

This stage is usually executed due to power failure; therefore the no-power stage (stage 6) is directly transferred no matter which operation is executing, that is:

1. The no-energy stage (stage1) is transferred to the no-power stage (stage 6).

2. The power-measuring stage (stage 2) is transferred to the no-power stage (stage 6).

3. The no-load stage (stage 3) is transferred to the no-power stage (stage 6).

4. The normal loading stage (stage 4) is transferred to the no-power stage (stage 6).

5. The brake stage (stage 5) is transferred to the no-power stage (stage 6).

In addition, as mentioned above, the power control system is further operated at an abnormal interruption stage and a manual shutdown stage. Also, the power-measuring stage (stage 2) is the intermediate stage between the abnormal interruption stage or the manual shutdown stage and the above-mentioned operation stages. Hence, the transferences between the abnormal interruption stage or the manual shutdown stage and the above-mentioned operation stages can be referred to FIG. 4.

Especially, the corresponding operations of the device or the electronic components are described as follows when the power control system is operated at different operation stages.

1. When the power control system is operated at the no-energy stage, the normally-closed switch unit is used to short the input bus in the three-phase short-circuit manner so that the external power is supplied to only the control unit, the input sensing unit, and the output sensing unit.

2. When the power control system is operated at the no-load stage, the load-dumping unit provides the load-dumping operation for the output power of the generator so that the voltage generated from the generator is reduced and the output power of the generator is reduced, and further the acceptable voltage is provided to the load.

3. When the power control system is operated at the brake stage, the control unit produces a control signal to turn on the power switch of the power conversion unit so as to brake the generator in the short-circuit manner.

In conclusion, the present invention has following advantages:

1. The control unit 102 judges and predicts the mechanical behavior of the generator 90 to control the generator 90 according to the voltage and the current, detected by the input sensing unit 104, and the load voltage and the load current, detected by the output sensing unit 106;

2. At the no-energy stage, the normally-closed switch unit 110 is used to short the input bus in the three-phase short-circuit manner to protect the generator; the external power is supplied to only the control unit 102, the input sensing unit 104, and the output sensing unit 106; and 3. At the no-load stage, the load-dumping unit 108 provides the load-dumping operation for the output power of the generator 90 so that the voltage generated from the generator 90 is reduced and the output power of the generator 90 is reduced. Accordingly, a current detected by the input sensing unit 104 is a load-dumping current $I_{DL}$ which flows through the load-dumping unit 108 and a loading current which flows to the load 80 for providing an acceptable voltage to the load 80.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A power control system for controlling a generator connected to an input bus and providing an output power generated from the generator to a load connected to an output bus, the power control system comprising:
   a control unit;
   an input sensing unit connected to the input bus for sensing a voltage and a current, generated from the generator, and transmitting the voltage and the current to the control unit;
   an output sensing unit connected to the output bus for sensing a load voltage and a load current, received by the load, and transmitting the load voltage and the load current to the control unit;
   a load-dumping unit connected between the input bus and the control unit for providing a load-dumping operation for the output power of the generator;
   a normally-closed switch unit electrically connected between-the generator and the control unit; and
   a power conversion unit connected between the input bus, the output bus, and the control unit for receiving the voltage and the current, and converting the voltage and the current into the load voltage and the load current;
   wherein the control unit judges and predicts a mechanical behavior of the generator to control the generator according to the voltage, the current, the load voltage, and the load current;
   wherein the normally-closed switch unit is a normally-closed relay;
   wherein the normally-closed switch unit is closed when the generator does not output power, and the normally-closed unit is opened when the generator outputs power.

2. The power control system in claim 1, further comprising:
   a drive unit for receiving a plurality of control signals generated from the control unit to control the load-dumping unit, the normally-closed switch unit, and the power conversion unit.

3. The power control system in claim 2, further comprising:
   a display unit connected to the control unit for displaying operation stages of the power control system; and
   a communication unit connected to the control unit for providing communication operations of the power control system;
   wherein the display unit and the communication unit are manually operated to brake the generator in a short-circuit manner.

4. The power control system in claim 3, wherein the power control system is operated at a no-energy stage, a power-measuring stage, a no-load stage, a normal loading stage, a brake stage, or a no-power stage.

5. The power control system in claim 4, wherein the input bus is shorted by the normally-closed switch unit in a three-phase short-circuit manner, and the control unit, the input sensing unit, and the output sensing unit are supplied by an external power, thus reducing the dependence of the power control system on the external power.

6. The power control system in claim 5, wherein the load-dumping unit provides the load-dumping operation for the output power of the generator so that the voltage generated from the generator is reduced and the output power of the generator is reduced when the power control system is operated at the no-load stage.

7. The power control system in claim 6, wherein the control unit reduces the voltage generated from the generator to be an extremely low voltage and then produces a control signal to turn on a power switch of the power conversion unit when the power control system is operated at the brake stage.

8. The power control system in claim 7, wherein the no-power stage is transferred to the power-measuring stage when the external power is normal; the power-measuring stage is transferred to the no-energy stage when the generator does not output a short-circuit current for a period of time; the no-energy stage is transferred to the power-measuring stage when the short-circuit current is detected or buttons of the display unit or interfaces of the communication unit are triggered; the power-measuring stage is transferred to the no-load stage when the current is within a security range; the no-load stage is transferred to the normal loading stage when the output current is detected; the normal loading stage is transferred to the brake stage when the output power of generator is excessive or buttons of the display unit or interfaces of the communication unit are triggered; the brake stage is transferred to the power-measuring stage when the voltage is extremely low; the no-load stage is transferred to the brake stage when no loading is detected for a period of time or buttons of the display unit or interfaces of the communication unit are triggered.

9. A power control system for controlling an output power generated from a generator to a load, the power control system comprising:
    a control unit;
    an input sensing unit for sensing a voltage and a current, generated from the generator, and transmitting the voltage and the current to the control unit;
    an output sensing unit for sensing a load voltage and a load current, received by the load, and transmitting the load voltage and the load current to the control unit; and
    a normally-closed switch unit electrically connected between the generator and the control unit;
    wherein a no-energy stage is executed when the generator does not output the power or the generator does not output the power for a waiting time; at the no-energy stage, the normally-closed switch unit is in a short-circuit condition so that an external power is supplied to only the control unit, the input sensing unit, and the output sensing unit;
    wherein the normally-closed switch unit is a normally-closed relay;
    wherein the normally-closed switch unit is closed when the generator does not output power, and the normally-closed unit is opened when the generator outputs power.

10. A method of controlling a power control system to control a generator connected to an input bus and provide an output power generated from the generator to a load connected to an output bus, the method comprising following steps of:
    providing a control unit;
    providing an input sensing unit and an output sensing unit, wherein the input sensing unit connected to the input bus for sensing a voltage and a current, generated from the generator, and transmitting the voltage and the current to the control unit; the output sensing unit connected to the output bus for sensing a load voltage and a load current, received by the load, and transmitting the load voltage and the load current to the control unit;
    providing a load-dumping unit connected between the input bus and the control unit for providing a load-dumping operation for the output power of the generator;
    providing a normally-closed switch unit electrically connected between the generator and the control unit;
    providing a power conversion unit connected between the input bus, the output bus, and the control unit for receiving the voltage and the current, and converting the voltage and the current into the load voltage and the load current; and
    judging and predicting a mechanical behavior of the generator to control the generator by the control unit according to the voltage, the current, the load voltage, and the load current;
    wherein the normally-closed switch unit is a normally-closed relay;
    wherein the normally-closed switch unit is closed when the generator does not output power, and the normally-closed unit is opened when the generator outputs power.

11. The method in claim 10, further comprising:
    providing a drive unit for receiving a plurality of control signals generated from the control unit to control the load-dumping unit, the normally-closed switch unit, and the power conversion unit.

12. The method in claim 11, further comprising:
    providing a display unit connected to the control unit for displaying operation stages of the power control system; and
    providing a communication unit connected to the control unit for providing communication operations of the power control system;
    wherein the display unit and the communication unit are manually operated to brake the generator in a short-circuit manner.

13. The method in claim 12, wherein the power control system is operated at a no-energy stage, a power-measuring stage, a no-load stage, a normal loading stage, a brake stage, or a no-power stage.

14. The method in claim 13, wherein the input bus is shorted by the normally-closed switch unit in a three-phase short-circuit manner, and the control unit, the input sensing unit, and the output sensing unit are supplied by an external power, thus reducing the dependence of the power control system on the external power.

15. The method in claim 14, wherein the load-dumping unit provides the load-dumping operation for the output power of the generator so that the voltage generated from the generator is reduced and the output power of the generator is reduced when the power control system is operated at the no-load stage.

16. The method in claim 15, wherein the control unit produces a control signal to turn on a power switch of the power conversion unit so as to brake the generator in a short-circuit manner when the power control system is operated at the brake stage.

17. The method in claim 16, wherein the no-power stage is transferred to the power-measuring stage when the external power is normal; the power-measuring stage is transferred to the no-energy stage when the generator does not output the short-circuit current for a period of time; the no-energy stage is transferred to the power-measuring stage when the short-circuit current is detected or buttons of the display unit or interfaces of the communication unit are triggered; the power-measuring stage is transferred to the no-load stage when the current is within a security range; the no-load stage is transferred to the normal loading stage when the output current is detected; the normal loading stage is transferred to the brake stage when the output power of generator is excessive or buttons of the display unit or interfaces of the communication unit are triggered; the brake stage is transferred to the power-measuring stage when the voltage is extremely low; the no-load stage is transferred to the brake stage when no loading is detected for a period of time or buttons of the display unit or interfaces of the communication unit are triggered.

* * * * *